(12) United States Patent
De Vos et al.

(10) Patent No.: US 9,670,314 B2
(45) Date of Patent: Jun. 6, 2017

(54) POLY(2-HYDROXYALKANOIC ACID) AND METHOD OF ITS MANUFACTURE

(71) Applicants: PURAC BIOCHEM BV, Gorinchem (NL); SULZER CHEMTECH AG, Winterthur (CH)

(72) Inventors: Siebe Cornelis De Vos, Arnhem (NL); Gerrit Gobius Du Sart, Herwijnen (NL); Robert Edgar Haan, Gorinchem (NL); Francois Loviat, Sennhof (CH)

(73) Assignees: PURAC BIOCHEM B.V., Gorinchem (NL); SULZER CHEMTECH AG, Winterthur (CH)

( * ) Notice: Subject to any disclaimer, the term of this patent is extended or adjusted under 35 U.S.C. 154(b) by 0 days.

(21) Appl. No.: 14/421,695

(22) PCT Filed: Aug. 14, 2013

(86) PCT No.: PCT/EP2013/067016
§ 371 (c)(1),
(2) Date: Feb. 13, 2015

(87) PCT Pub. No.: WO2014/027037
PCT Pub. Date: Feb. 20, 2014

(65) Prior Publication Data
US 2015/0210802 A1    Jul. 30, 2015

Related U.S. Application Data

(60) Provisional application No. 61/683,738, filed on Aug. 16, 2012.

(30) Foreign Application Priority Data

Aug. 16, 2012 (EP) .................................. 12180654

(51) Int. Cl.
*C08G 63/78* (2006.01)
*C08G 63/85* (2006.01)
*C08G 63/08* (2006.01)
*C08G 63/82* (2006.01)
*C08G 63/06* (2006.01)
*C08G 63/91* (2006.01)

(52) U.S. Cl.
CPC ............ *C08G 63/85* (2013.01); *C08G 63/06* (2013.01); *C08G 63/08* (2013.01); *C08G 63/78* (2013.01); *C08G 63/823* (2013.01); *C08G 63/91* (2013.01); *C08G 63/912* (2013.01)

(58) Field of Classification Search
CPC ........ C08G 63/06; C08G 63/08; C08G 63/78; C08G 63/823; C08G 63/85; C08G 63/91; C08G 63/912
See application file for complete search history.

(56) References Cited

U.S. PATENT DOCUMENTS

| | | | | | |
|---|---|---|---|---|---|
| 5,120,802 | A | * | 6/1992 | Mares ..................... | A61L 15/64 525/410 |
| 5,686,540 | A | * | 11/1997 | Kakizawa ............... | C08L 67/02 524/115 |
| 5,770,682 | A | | 6/1998 | Ohara et al. | |
| 6,153,276 | A | * | 11/2000 | Oya ....................... | B32B 27/08 383/109 |
| 6,353,086 | B1 | | 3/2002 | Kolstad et al. | |
| 2011/0306733 | A1 | * | 12/2011 | Suzuki .................. | B01J 19/006 525/415 |

FOREIGN PATENT DOCUMENTS

| | | |
|---|---|---|
| CN | 1299393 A | 6/2001 |
| WO | 99/50345 A1 | 10/1999 |
| WO | 2010/012770 A1 | 2/2010 |
| WO | WO2010095656 A1 * 8/2010 | ............ B01J 19/006 |

OTHER PUBLICATIONS

Odian, G.; Principles of Polymerization, 2004, p. 22.*
Tsuji, H., et al.; Polymer, 2014, vol. 55, p. 721-726.*
Masutani, K., et al.; Poly(lactic acid) Science and Technology: Processing, Properties, Additives and Applications, 2015, p. 1-36.*
Jan. 21, 2014 International Search Report issued in International Patent Application No. PCT/EP2013/067016.
Jan. 21, 2014 Written Opinion issued in International Patent Application No. PCT/EP2013/067016.
Mar. 18, 2016 Office Action issued in Chinese Application No. 201380043036.1.
May 30, 2016 Office Action issued in Eurasian Application No. 201590310/28.

* cited by examiner

*Primary Examiner* — Robert Jones, Jr.
(74) *Attorney, Agent, or Firm* — Oliff PLC

(57) ABSTRACT

A method for manufacturing poly(2-hydroxyalkanoic acid) included the steps of a) mixing a cyclic diester of a 2-hydroxyalkanoic acid and a polymerization catalyst, b) polymerizing the cyclic diester to form poly(2-hydroxyalkanoic acid) in liquid phase, c) adding a phosphoric acid ester as a catalyst deactivating agent to the liquid phase, d) applying a devolatilization step to the liquid phase, and e) allowing the poly(2-hydroxyalkanoic acid) to solidify. The catalyst deactivating agent is added after the devolatilization step is applied. The method results in an improved melt stability of the manufactured polymer.

19 Claims, 4 Drawing Sheets

Figure 1:
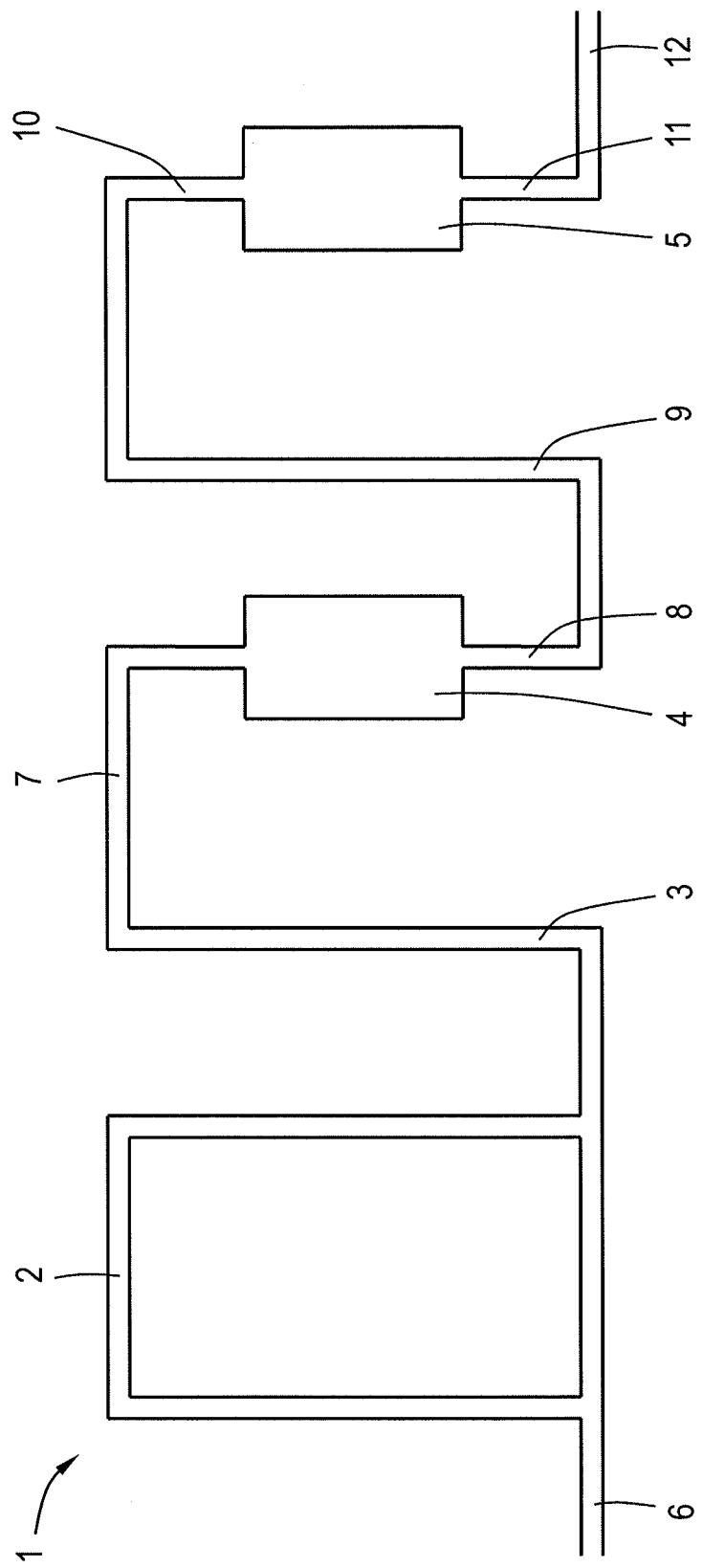

| Exp. | cat [ppm] | ROH [mmol/kg] | Endcapper [mol/mol$_{ROH}$] | Endcapper type/position | catalyst deactivator [wt%] | catalyst deactivator position | RM at P12 [wt%] | ΔRM [wt%] | Mn/PS at P12 [kg/mol] | ΔMn/PS [%] | ΔMw/PS [%] |
|---|---|---|---|---|---|---|---|---|---|---|---|
| A | 75 | 20 | - | - | - | - | 1.61 | +2.8 | 105 | -7.6 | -1.9 |
| B | 50 | 20 | 2.0 | SA / 7 | - | - | 1.30 | +1.9 | 110 | 2.9 | 8.3 |
| C | 150 | 15 | - | - | 0.13 | 7 | 1.60 | +3.0 | 113 | 1.1 | 5.9 |
| D | 150 | 15 | 1.2 | AA / 7 | 0.13 | 7 | 0.17 | +0.6 | 114 | 2.8 | 4.2 |

Figure 3

| Exp. | cat [ppm] | ROH [mmol/kg] | Endcapper [mol/mol_ROH] | Endcapper type/position | catalyst deactivator [wt%] | catalyst deactivator position | RM at P12 [wt%] | ΔRM [wt%] | Mn/PS at P12 [kg/mol] | ΔMn/PS [%] | ΔMw/PS [%] |
|---|---|---|---|---|---|---|---|---|---|---|---|
| A | 150 | 15 | 1.8 | AA/7 | 0.19 | 8 | 0.10 | -0.08 | 132 | 0.1 | 2.2 |
| B | 150 | 20 | 1.4 | AA/7 | 0.19 | 8 | 0.11 | -0.10 | 113 | 0.2 | 0.7 |
| C | 150 | 11 | 1.3 | AA/7 | 0.12 | 8 | 0.11 | 0.00 | 172 | -3.5 | -3.7 |
| D | 50 | 15 | 1.8 | AA/7 | 0.19 | 8 | 0.10 | -0.13 | 133 | 2.4 | 5.7 |
| E | 75 | 13 | 1.8 | SA/7 | 0.26 | 8 | 0.14 | -0.08 | 157 | -2.8 | -1.8 |

Figure 4

POLY(2-HYDROXYALKANOIC ACID) AND METHOD OF ITS MANUFACTURE

The present invention method for manufacturing poly(2-hydroxyalkanoic acid), comprising the steps of mixing a cyclic diester of a 2-hydroxyalkanoic acid and a polymerization catalyst, polymerizing the cyclic diester to form poly(2-hydroxyalkanoic acid) in liquid phase, adding a phosphoric acid ester as a catalyst deactivating agent to the liquid phase, applying a devolatilisation step to the liquid phase, and allowing the poly(2-hydroxyalkanoic acid) to solidify. The invention also relates to poly(2-hydroxyalkanoic acid) obtainable by this method.

Poly(2-hydroxyalkanoic) acids constitute a class of polymer compounds which currently receive much interest. Examples of such polymers compounds are polyglycolide, poly(ε-caprolactone) and poly(hydroxybutyrate) as well as their copolymers. Nowadays, most attention however is devoted to polylactide, which is also referred to as polylactic acid and abbreviated as PLA. This polymer is an aliphatic polyester, which can be manufactured from renewable resources. This manufacturing involves the fermentation of starch or sugar into lactic acid. PLA is usually synthesized either by direct polycondensation of lactic acid (lactate monomers), or by ring-opening polymerization (ROP) of lactide (cyclic lactate dimers). High molecular weight polymers are usually produced by means of the second method using lactide. Such lactides are most often obtained by depolymerization of PLA oligomers as a result of ring-closures reactions in the presence of a suitable catalyst. After purification, the lactide can be polymerized into PLA of controlled molecular weight by means of a ring-opening polymerization reaction.

A method of the type mentioned in the opening paragraph is known as such. For example, the patent document U.S. Pat. No. 5,770,682 describes a process for producing polylactic acid (PLA) by ring-opening polymerization of lactide in the presence of a catalyst like tin octoate. Under the applied reaction temperature of 160° C., both the lactide and the formed PLA are in the molten state. At the completion of the reaction, a phosphoric acid ester is added as a catalyst inactivating agent. The formed PLA is subsequently transferred into a twin-screw kneader, in which the remaining lactide is removed by reducing the pressure. Latter process is also referred to as devolatilisation. In this manner, PLA with a MW of more than 180.000 and having a lactide content of less than 3 percent by weight can be manufactured in an elegant manner. This PLA moreover shows hardly or no discolorization.

In Applicant's view, the known method can be improved. This holds especially because it was found that the melt stability of the formed PLA in the known process is not optimal. More precisely, it has been shown that after the devolatilisation step an appreciable amount of lactide is reformed from the PLA in the liquid phase, via a process which is called 'back-biting'. This process is disadvantageous with respect to the PLA end product. Firstly, it reduces the MW of the manufactured PLA after the devolatilisation step. Secondly, it increases also the lactide concentration in the ultimate PLA product, which increase is not desired because of the plasticizing effect of lactide as well as possible deposit of lactide on processing equipment. Finally, the PLA manufactured by the known process sometimes shows a slight yellow discolorization, which is also not desired.

The object of the present invention is inter alia to improve the known method. More precisely, the invention aims at an increase of the melt stability of the formed polymer after the devolatilisation step. The invention additionally strives at a possible further decrease in discolorization.

These and possible other objects of the invention are achieved by a method for manufacturing poly(2-hydroxyalkanoic acid), comprising the steps of mixing a cyclic diester of a 2-hydroxyalkanoic acid and a polymerization catalyst, polymerizing the cyclic diester to form poly(2-hydroxyalkanoic acid) in liquid phase, adding a phosphoric acid ester as a catalyst deactivating agent to the liquid phase, applying a devolatilisation step to the liquid phase, and allowing the poly(2-hydroxyalkanoic acid) to solidify, which method is characterized according to the invention in that the catalyst deactivating agent is added after the devolatilisation step is applied.

The inventors have found that adding the phosphoric acid ester catalyst deactivating agent after the devolatilisation step improves the known polymerization process in various aspects. First, the decrease of the MW of the produced polymer immediately after the devolatilisation step is significantly reduced. Secondly, it has been observed that the amount of cyclic diester in the polymerized end product is less as compared with the known process, in which the catalyst deactivating agent is added before the devolatilisation step. Thirdly, the inventors also observed that the discolorization of the produced polymer was less when it was prepared by means of the presently invented method. The method according to the invention functions optimally if the concentrations of cyclic diester and its corresponding polymer are at thermodynamic equilibrium in the liquid phase just before the devolatilisation step. It is also noted that the deactivating agent is added to and mixed with the liquid phase before the polymer in said phase is solidified.

It is noted that the phosphoric acid ester which is used in the course of the present invention is not limited to a single compound, but in principle may be a mono-ester, a di-ester, or a tri-ester of orthophosphoric acid or a partially or full esterified form of polyphosphoric acid. Mixtures of these different phosphoric acid ester compounds may be used as well. It is also observed that the polymerization in principle may be performed in solution or in melt, of which melt polymerization is preferred due to lack of need for solvent and solvent recovery.

In the execution of the present invention, any catalyst which is able to polymerize a cyclic diester into its corresponding polymeric form can be used as long as it can be inactivated by a phosphoric acid ester. Suitable catalysts for use in the present invention are those well-known in the art for polymerization of cyclic diesters, such as metal coordination compounds comprising a metal ion having more than one stable oxidation state. Of this class of catalysts, the tin-containing compounds are preferred, of which tin-octoate is the most preferred catalyst. The cyclic diester may be in solid phase when mixing it with the catalyst. However, bringing the cyclic diester into molten phase and adding the catalyst afterwards is preferred.

When the devolatilisation step is performed, a reduced partial pressure is applied to the melt. This can be achieved by means of applying a vacuum and/or a purge stream of for example nitrogen gas.

An interesting embodiment of the invented method is characterized in that the phosphoric acid ester comprises an alkanoic acid phosphate compound. Compounds of this type generally are not corrosive and easy to handle. This holds especially for alkanoic acid phosphate compounds in the form of stearic acid phosphate compounds. Especially interesting is the embodiment of the method according to the present invention which is characterized in that the stearic acid phosphate compound is a mixture of monostearic acid phosphate and distearic acid phosphate. Such stearic acid phosphate mixture is commercially available as flakes. These compounds can easily be converted into the liquid form by heating them above their melting range, in which they can remain stable for a prolonged time. In this liquid form, precise amounts of the catalyst deactivating agent can be added to the liquid polymer in an accurate manner.

The amount of catalyst deactivating agent to be added typically ranges from 0.02-0.4 weight percent relative to the total weight of the process stream. If less than 0.02 weight percent is added, the polymerization reaction cannot proceed to completion. If more than 0.4 weight percent is added, no additional deactivating effect is noted anymore. So, adding more than 0.4 weight percent leads to wasting of the catalyst deactivating agent. To avoid both disadvantages as much as possible, it is preferred to use an amount of catalyst ranging between 0.05 and 0.2 weight percent of added catalyst deactivating agent. Most preferred is an added amount of catalyst deactivating agent of approximately 0.1 weight percent relative to the total weight of the process stream.

Another embodiment of the invented method is characterized in that the cyclic diester is lactide. Although the method is not limited to polymers of this cyclic diester and co-polymers can be formed as well, it appears that the use of lactide in the invented method functions well. Thus, PLA manufactured in this way shows a relatively high melt-stability in combination with a low lactide-content and a low colorization.

It is well-known that lactide can exist in three different geometric structures, which have a diastereomeric relationship. These different structures can be distinguished as R,R-lactide (or D-lactide), S,S-lactide (or L-lactide) and R,S-lactide (or meso-lactide). Mixtures of equal amounts of D- and L-lactide are often referred to as racemic lactide or rac-lactide. Within the scope of the present invention, both the three pure lactides (being composed of only one diastereomer) as well as mixtures of two or more of the pure lactides can be used. The lactide can be added in liquid form directly after its production and purification, e.g. from a depolymerized prepolymer of lactic acid. The lactide can also be added from storage where it is kept in solid form, like a powder or flakes.

Much attention has been devoted to the embodiment of the present invention, which is characterized in that an end-capping agent is added to the poly(2-hydroxyalkanoic acid) in the liquid phase. The inventors have found that the addition of an end-capping agent significantly adds to the melt-stability of the manufactured poly(2-hydroxyalkanoic acid). This holds especially in case that the polymer is a polylactide. Without being bound to any theory, the inventors believe that said end-capping agent reacts with the hydroxyl-end group of the formed polymer. The presence of these reacted end-capping agents appears to lower the rate of lactide formation caused by depolymerization of the formed polylactide via a so-called 'backbiting' mechanism. Lactide amounts formed in the polymer in liquid phase via this mechanism can become unacceptably large when the polymer is subjected to high temperature treatments, in particular when the treatments are performed at reduced pressures. As the end-capping agent terminates both polymerization and clepolymerization, the agent is preferably added at the end of the polymerization of lactide into polylactide, i.e., typically when at least 90%, preferably at least 95 and most preferably at least 97% of the lactide has been converted into polylactide. In practice, this percentage is dictated by the thermodynamic equilibrium at the given temperature of the liquid phase.

It appears that the aimed improvement of the melt stability of the polymer is especially obtained when both the end-capping agent and the catalyst deactivating agent are added to the polymer in liquid phase. Adding only the end-capping agent or only the catalyst deactivating agent did not result in a similar high increase of the polymer melt stability as compared with the situation in which both agents are added.

In principle, different classes of hydroxyl-binding end-capping agents can be used. A first interesting class of end-capping agents is the class of isocyanates and diisocyanates. Another interesting class of end-capping agents is the class of epoxides and bis-epoxides. Compounds of these classes are in principle suitable for use as end-capping agent in the invented method.

An interesting embodiment of the invented method is characterized in that the end-capping agent and the deactivating agent are added to the poly(2-hydroxyalkanoic acid) in the liquid phase at different stages of the polymerization. The inventors believe that this measure largely excludes the possibility that a part of the end-capping agent and the deactivating agent mutually interact and possibly even react. Such interactions and/or reactions could inactivate the working of one or both agents, which is considered to be disadvantageous. So, adding both agents to the formed poly(2-hydroxyalkanoic acid) in liquid phase at different stages of the polymerization process is seen as an effective measure to overcome this drawback. The inventors were able to show that preferably the invented method works better when the end-capping agent is added prior to the deactivating agent. In the course of the present invention, it is preferred that the end-capping agent is added to the reaction mixture before the devolatilisation step is applied whereas the catalyst deactivating agent is added after the devolatilisation step.

It is observed that in a batch polymerization process, the expression 'different stages of the polymerization process' refers to a different moment in time. However, in a continuous process, the expression 'different stages of the polymerization process' refers to different positions of the polymerization apparatus along which the liquid phase flow of the reacting mixture is guided.

Also advantageous is the embodiment of the invented method which is characterized in that the end-capping agent is an anhydride. Using end-capping agents chosen from the class of anhydrides is advantageous as they show minimal by-products in the reaction with the polymer material. It is further observed that the reactivity of the anhydrides in the presently claimed method is better than the reactivity of (bis)isocyanates and (bis)epoxides. Isocyanate chemistry generally suffers from considerable side-reactions occurring under the used high temperature polymerization conditions, whereas the epoxides react faster with carboxylic acid end groups than with hydroxyl end groups. It is stressed that the class of anhydride compounds includes di- and multi-anhydride compounds as well.

A further interesting embodiment of the invented method is characterized in that the anhydride is phthalic anhydride. Good results are obtained when this compound is used as end-capping agent in the invented method. When this compound is added to the poly(hydroxyalkanoic acid) in liquid phase, the hydroxyl-end group of formed polymer chains is converted into an aromatic carboxylic acid end group.

Another interesting embodiment of the method according to the invention has the feature that the anhydride is acetic anhydride. When this compound is added to the PLA or to another poly(hydroxyalkanoic acid) in liquid phase, the hydroxyl-end group of formed polymer chains is converted into a methyl end group. The use of acetic anhydride as an end-capping agent is preferred over the use of phthalic anhydride. Latter compound has a considerably higher molecular weight as compared with acetic anhydride. So, less material need to be added and mixed with the polymer in liquid phase when using acetic anhydride.

Very special interest exists in the embodiment of the invented method having the feature that the anhydride is succinic anhydride. When this compound is added to the PLA or to another poly(2-hydroxyalkanoic acid) in liquid phase, the hydroxyl-end group of formed polymer chains is converted into an aliphatic carboxylic acid end group. The use of succinic anhydride as end-capping agent is preferred over the use of phthalic anhydride because of the considerably higher molecular weight of the latter anhydride. The preference for the use of succinic anhydride over acetic anhydride is because the former compound does not generate volatile low molecular weight species and the volatility of succinic acid itself is relatively low. Volatility of the end-capper can cause problems when the polymer in liquid phase containing such anhydride is subjected to a devolatilisation step. In practice such problems do not occur with succinic anhydride is used as end-capping agent.

Experiments have shown that the added amount of end-capping agent to the poly(2-hydroxyalkanoic acid) in liquid phase preferably is in the range between 0.1 and 4 molar excess to the amount of hydroxyl end groups. If the amount of end-capping agent is smaller than 0.1 molar excess, the increase in the polymer melt stability is insufficient. If, on the other hand, the added amount of end-capping agent is higher than 4 molar excess, no further increase in the polymer melt stability is observed. Such high amounts are therefore only polluting the formed poly(2-hydroxy alkanoic acid) and adding to the total costs of the resin. An optimal compromise between both negative effects is obtained when the amount of end-capping agent is chosen between 0.5 and 2 molar excess, preferably between 0.8 and 1.5 molar excess.

A preferred embodiment of the invented method has the characteristic that an additional devolatilization step is applied on the formed poly(2-hydroxyalkanoic acid) in liquid phase after the addition of the deactivating agent. Remaining diester in the polymer in liquid phase can be removed by means of such a devolatilisation step. The devolatilisation step is performed by means of a lowering of the pressure in the polymer in liquid phase, preferably below 10 mbar. Additionally, it is possible to purge by guiding inert gas through the polymer in liquid phase.

The invention also relates to a poly(2-hydroxyalkanoic acid), which is obtainable with the above-described method. Said polymer is characterized in that it has a $M_n$ relative to Polystyrene Standards ranging between 20000 and 500000 g/mol as determined by Gel Permeation Chromatography (GPC, also referred to as Size Exclusion Chromatography) in chloroform using LALLS-detection. Such polymer can answer most requirements posed by the current applications.

Preferred is a poly(2-hydroxyalkanoic acid) obtainable with the method according to the present invention, which is, characterized in that the concentration of cyclic diester in the corresponding polymer is less than 0.5% by weight, and preferably less than 0.3%. These amounts of lactide in the polyester polymer can be measured using methods like NMR, FT-IR and chromatography-based techniques.

One of the most important requirements pertains to weight loss at high temperature. Polymers obtainable by the presently invented method typically show a weight decrease in liquid phase at 250° C. during a period of 1 hour of less than 2% by weight, and preferably less than 1.5% by weight. These changes in weight can be measured by means of Thermogravimetric Analysis (TGA), which usually is performed under a nitrogen atmosphere.

Such polymer prepared with the method according to the present invention further shows phosphorus in an amount ranging between 5-1000 ppm, preferably 10-500 more preferably 100-300 ppm. The amount of phosphorus in the polymer can be determined by standard elemental analysis techniques.

Figure 2:
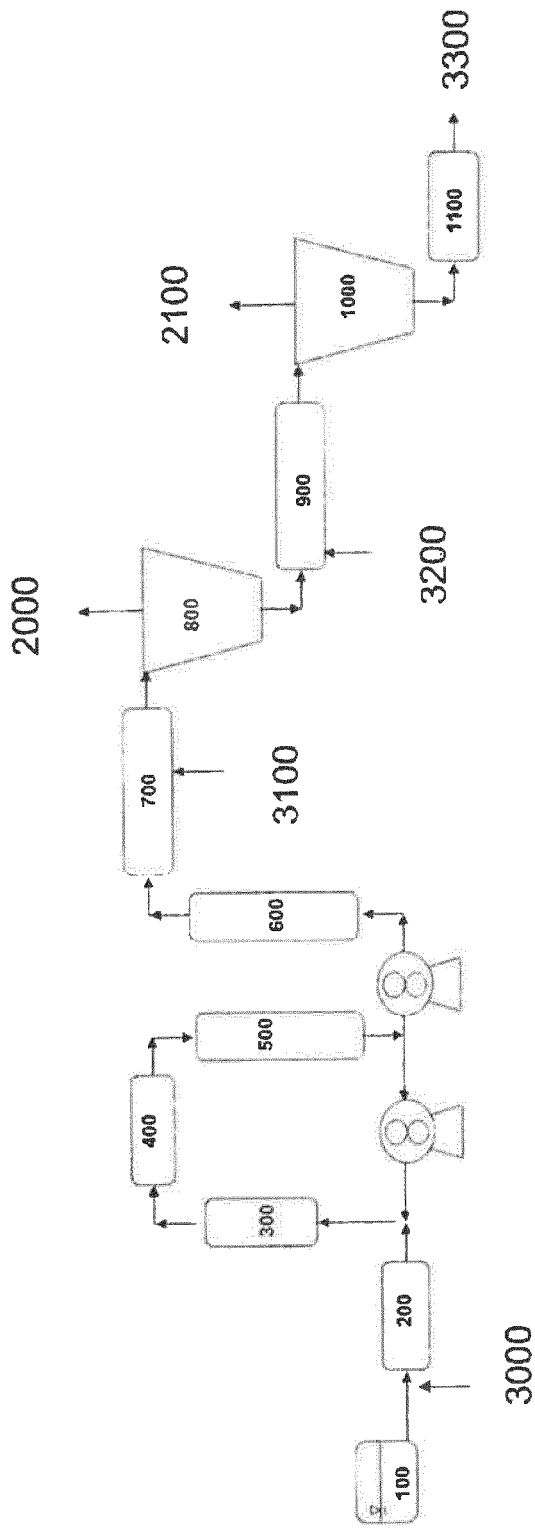

The invention is elucidated by means of the examples detailed below and by means of the drawing, in which FIG. 1 shows a schematic drawing (not to scale) of an apparatus for performing the method according to the present invention for manufacturing poly(2-hydroxyalkanoic acid) from the corresponding cyclic diester, FIG. 2 shows a schematic drawing (not to scale) of an alternative apparatus for performing the method according to the present invention, FIG. 3 shows a first table (Table 1) depicting data of a series of experiments performed in the course of the present invention, and FIG. 4 shows a second table (Table 2) depicting data of a second series of experiments performed in the course of the present invention.

In FIG. 1 a polymerization apparatus 1 is depicted, which comprises a loop reactor 2, a plug flow reactor 3 and a two-stage vacuum devolatilisation unit, containing devolatilisation tanks 4 and 5. A polymerization apparatus of this type has been described in more detail in the international patent application with publication number WO2010/012770-A1, filed in the name of the present applicants.

The cyclic diester of a 2-hydroxyalkanoic acid of which a polymer needs to be manufactured and a polymerization catalyst are mixed in molten form and added at position 6 in the polymerization apparatus. The temperature of the mixture is chosen such that the mixture remains in liquid form. If alcoholic functionalities need to be added, they can be introduced in the system at the same position, for example as alcohols. The mixture is transported in a continuous way to and circulated in the loop reactor 2. Part of the partially polymerized mixture is separated from the loop reactor 2 and transported in a continuous manner through the plug flow reactor 3. Reaction conditions (temperature, flow speed, catalyst concentration, etc) are chosen such that the conversion of the cyclic diester in the reaction mixture is (almost) complete and at equilibrium with the corresponding polymer at the end of plug flow reactor 3.

At position 7 (at the end of plug flow reaction 3 and before devolatilisation tank A), a sampling point allows the injection of an end-capping agent or a catalyst deactivating agent. At position 8 (after devolatilisation tank 4) a second sampling point is available for the same purpose. Additional sampling points have been designed in the apparatus at position 9 (in the middle of the connection line between both devolatilisation tanks 4 and 5), at position 10 (just before the second devolatilisation tank 5) and at positions 11 (just after the second devolatilisation tank 5). At all sampling points as well as at the end of the polymerization apparatus it is possible to collect small amounts from the flowing polymerization mixture for analysis purposes. These samples can be quenched and their content measured to quantify the cyclic diester content, the end-capper content, the catalyst content and the catalyst deactivating agent content.

In order to verify the effectiveness of the catalyst deactivation on the melt stability of the reaction mixture, the following criteria have been adopted. The result of an experiment is considered positive if the residual monomer content of the polymer product at the end of the process (position 12) is less than 0.5% by weight (w/w). Otherwise, the result is considered negative. For all positive results, the catalyst deactivation process is considered more efficient, the lower the increase in residual monomer through the line connecting the devolatilization tanks 4 and 5 (transfer line). The increase in residual monomer through the transfer line being measured as the difference in residual monomer between samples taken in position 10 and in position 9.

FIG. 2 shows another embodiment of a polymerization apparatus suitable for carrying out the invention. Monomer tank 100 contains a cyclic diester of a 2-hydroxyalkanoic acid under inert atmosphere. At position 3000 the polymerization catalyst and optional alcoholic functionalities may be added.

Next the cyclic diester monomer and other components enter a loop reactor comprising static mixer units 300 and 400 and heat exchanger unit 500. It is noted that the components may enter the loop reactor by means of an optional static mixer unit 200. One skilled in the art will understand that each of the units 200 to 500 may comprise one or more subunits.

A polymerized mixture with a monomer conversion ranging from 25 to 75% by weight exits the loop reactor and enters unit 600, which may comprise one or more static mixer or heat exchanger subunits or their combinations. The polymerized mixture next enters unit 700, which may comprise one or more static mixer or heat exchanger subunits or their combinations. The polymerized mixture with a monomer conversion higher than 75% by weight next enters a first devolatilization unit 800, in which unreached monomer is removed by means of vacuum and/or an inert gas stream. One skilled in the art will understand that unit 800 may comprise one or more subunits. The first devolatilized polymerized mixture next enters optional unit 900, which may comprise one or more static mixer or heat exchanger subunits or their combinations. The first devolatilized polymerized mixture next enters optional second devolatilization unit 1000, which may comprise one or more subunits. Finally the polymer product enters finishing device 1100 which may by a pelletizer, extruder, or other product finishing device, and exits the system as product 3300, which may be in the form of pellets, granulates, or finished product.

It is noted that in this embodiment the devolatilized cyclic diester monomer is removed from the polymerized mixture as part of streams 2000 and 2100. Typically somewhat elevated pressures may be present in units 200 to 700, as well as 900 and 1100. Typically, low pressures may be present in units 800 and 1000, such pressures will often be less than 50, preferably less than 20 mbar. Typical temperature ranges for units 100 to 200 will be from 80 to 150° C., and typical temperature ranges for units 300 to 1100 will be from 150 to 250° C.

A catalyst deactivating agent and/or an optional end capping agent may be added in this embodiment at positions 3100 and/or 3200.

In all experiments described below, Puralact lactide (Purac, either D or L) was used as the cyclic diester of 2-hydroxyalkanoic acid. Tin octoate was used as the catalyst. Small amounts of alcohols were added to accelerate the reaction. When used, the commercially available compound ADK STAB AX-71™ (Adeka Palmarole, a 1:1 mixture of mono and distearyl acid phosphate) was used as a catalyst deactivating agent. When used, acetic anhydride (AA) or succinic anhydride (SA) were used as end-capping agent in the polymerization reaction.

In a first series of experiments, the effect of the catalyst deactivating agent on the polymerization process was investigated in the absence of end-capping agents. In these experiments, L-Puralact was used as the cyclic diester of 2-hydroxyalkanoic acid. Tin octoate was used as the catalyst. Small amounts of alcohols were added to accelerate the reaction. The commercially available compound ADK STAB AX-71™ (Adeka Palmarole), a 1:1 mixture of mono and distearyl acid phosphate) was used as a catalyst deactivating agent. No end-capping agent was used in this series of experiments.

In the execution of the experiments, the lactide was heated to 100-130° C. and mixed with appr 150 ppm $Sn(oct)_2$. A small amount of alcohol of approximately 15-20 mmol per kg lactide was added as well. This mixture was entered at position 6 into polymerization apparatus 1 as shown in FIG. 1. The loop reactor and plug flow reactor conditions were optimized such that at position 7 the polymerization degree was at approximately 95%. In first experiments (a), an amount of 0.63 g/m of ADK STAB AX-71™ was added to the polymerization reaction mixture at position 7. In second experiments (b), approximately the same amount of ADK was added to the polymerization reaction mixture at position 8. For both the first and the second series, samples of the polymerization reaction mixture were collected at positions 9 and 11. From these samples, the lactide concentration was determined as well as the change in lactide between the positions 8 and 11.

In the first experiments (a), the lactide concentration increased with 2.9% by weight on average over the flow distance between positions 8 to position 11. In the second experiments (b), the lactide concentration increased with 0.0% by weight over the same flow distance). From these observations, it is concluded that the melt stability is better for the second experiments (b). Therefore, the melt stability in the reaction mixture of the PLA in liquid phase is higher if the catalyst deactivating agent is added after the first devolatilisation step.

In a second series of experiments, the effect of using the catalyst deactivating agent and the end-capper was investigated. The experimental conditions and the results of the experiments are given in Table 1, which is shown in FIG. 3. In this Table 1, ΔRM is calculated as the difference between the residual monomer at point 10 and at point 9 in FIG. 1. ΔMn and ΔMw are calculated as difference between the molecular weights at point 12 and 7.

In these experiments, Puralact lactide was heated to appr. 100-130° C. and mixed with appr. 75-150 ppm $Sn(oct)_2$. 15-20 mmol of alcohol per kg of lactide was added as well. This mixture was entered at position 6 into polymerization apparatus 1. The loop reactor and plug flow reactor conditions were optimized such that at position 7 the polymerization proceeded to approximately 95% conversion. Thus, the lactide was entered in the apparatus with a mass flow rate of 20 kg/h. The mass flow rate in the loop reactor was 200 kg/h. The mass flow rate in the plug flow reactor was again 20 kg/h. The temperature of the reactors ranged between 170 and 200° C.

In the first experiment (a) of this second series, no ADK and no end-capper were added to the reaction mixture. In the second experiment (b) only the end-capper was added before the first devolatilization step. In the third experiment (c), only the ADK compound was added before the first devolatilization step. In the last experiment (d), both the end-capper and the ADK were added at position 7 before the first devolatilization step. In all the first three cases (a-c) the final residual monomer at position 12 was much larger than 1% and in the range 1.3-1.6%. The result of all the three experiments was therefore negative. In the last case (d) the final residual monomer at P12 was 0.17%, and the result of the experiment was positive. Nevertheless, a significant residual monomer increase in the transfer line (between positions 9 and 10) was measured also for this case (+0.63%). From the second series of experiments it can be concluded that: (i) mixing into the polymerization mixture before the first devolatilization step, the end-capper alone or the ADK compound alone, is not effective in stabilizing the polymerization mixtures with respect to monomer reformation; (ii) by mixing both the end capping agent and the ADK compound to the polymerization mixtures before the devolatilization process, improves the melt stability and enable the production of a polymer with low residual monomer content; (iii) the polymer stabilization with respect to monomer reformation when adding the end-capper and the ADK compound before the first devolatilization step is nevertheless not optimal due to the fact that side reactions (e.g. back-biting) are not completely suppressed causing monomer reformation in the transfer line.

In a third series of experiments, the effect of dosing the catalyst deactivating agent at different positions was investigated. For this series of experiments, acetic anhydride or succinic anhydride were introduced into the system at position 7. Differently, ADK was introduced into the system at position 8, just after the first devolatilization step (tank 4) and before the second devolatilization step (tank 5). The experimental conditions as well as the measured results are shown in Table 2, which is shown in FIG. 4. In this Table 2, ΔRM is calculated as the difference between the residual monomer at point 10 and at point 9 in FIG. 1. ΔMn and ΔMw are calculated as percentage difference between the molecular weights at point 12 and 7.

In all cases, the final residual monomer value, at position 12, was between 0.1-0.14%. Accordingly, all tests were considered positive. Additionally, in all cases, irrespective of the amount of catalyst used, or of the final polymer molecular weight (at P12), a remarkable melt stability was observed in terms of monomer reformation. In fact, as evident from the experimental results, in all cases no increase in monomer concentration was measured in the transfer line between position 9 and 10.

By comparing the results of the third series of experiments with those of the second series, it can be concluded that:
adding an anhydride end-capper and a phosphorous compound to the polymerization mixture improves the melt stability and enables to reach lower residual monomer values at the end of the whole devolatilization process (Table 1 exp (a-c) vs. exp. (d));
adding the anhydride end-capper before the first devolatilization step and the phosphorous compound after the first devolatilization step further improves the melt stability, as evident by the absence of any measurable monomer reformation in the transfer line (cf. results in Table 2 vs. Table 1-d). Adding the end-capper and phosphorous compound in this way was also found to give less color formation than obtained with another method of their addition whereby both compounds are added prior to the first devolatilization step.

The invention claimed is:

1. Method for manufacturing polylactic acid, comprising the steps of mixing a lactide of a 2-hydroxyalkanoic acid and a polymerization catalyst, polymerizing the lactide to form polylactic acid in liquid phase, adding a phosphoric acid ester as a catalyst deactivating agent to the liquid phase, applying a devolatilisation step to the liquid phase, and allowing the polylactic acid to solidify, wherein the catalyst deactivating agent is added after the devolatilisation step is applied.

2. Method according to claim 1, wherein the phosphoric acid ester comprises an alkanoic acid phosphate compound.

3. Method according to claim 1, wherein an end-capping agent is added to the polylactic acid in the liquid phase.

4. Method according to claim 3, wherein the end-capping agent is added in the liquid phase after at least 90% by weight of the lactide is converted into the corresponding polylactic acid.

5. Method according to claim 3, wherein the end-capping agent and the catalyst deactivating agent are added to the polylactic acid in the liquid phase at different stages of the polymerization process.

6. Method according to claim 3, wherein the end-capping agent is added prior to the deactivating agent.

7. Method according to claim 3, wherein the end-capping agent is an anhydride.

8. Method according to claim 7, wherein the anhydride is at least one selected from the group consisting of phthalic acid anhydride, acetic acid anhydride and succinic acid anhydride.

9. Method according to claim 3, wherein the amount of added end-capping agent to the polylactic acid in liquid phase is in the range between 0.1 and 4 molar excess as compared to the amount of hydroxyl end groups.

10. Method according to claim 1, wherein an additional devolatilisation step is applied on the formed polylactic acid in liquid phase after the addition of the deactivating agent.

11. Polylactic acid obtainable with the method according to claim 1, wherein the polymer has a $M_n$, relative to Polystyrene Standards ranging between 20000 and 500000 g/mol,
wherein the concentration of cyclic diester in the corresponding polymer is less than 0.5% by weight, and
wherein its weight decrease in liquid phase at 250° C. during a period of 1 hour is less than 2% by weight.

12. Polylactic acid according to claim 11, wherein it comprises phosphorus in an amount ranging between 5-1000 ppm.

13. Method according to claim 3, wherein the end-capping agent is added in the liquid phase after at least 95% by weight of the lactide is converted into the corresponding polylactic acid.

14. Method according to claim 3, wherein the end-capping agent is added in the liquid phase after at least 97% by weight of the lactide is converted into the corresponding polylactic acid.

15. Method according to claim 3, wherein the amount of added end-capping agent to the polylactic acid in liquid phase is in the range between 0.5 and 2 molar excess as compared to the amount of hydroxyl end groups.

16. Method according to claim 3, wherein the amount of added end-capping agent to the polylactic acid in liquid phase is in the range between 0.8 and 1.5 molar excess as compared to the amount of hydroxyl end groups.

17. Polylactic acid according to claim 11, wherein the concentration of lactide in the corresponding polymer is less than 0.3% by weight.

18. Polylactic acid according to claim 11, wherein its weight decrease in liquid phase at 250° C. during a period of 1 hour is less than 1.5% by weight.

19. Method according to claim 2, wherein alkanoic acid of the alkanoic acid phosphate compound is stearic acid.

* * * * *